US012633433B2

(12) United States Patent
Gustafsson et al.

(10) Patent No.: US 12,633,433 B2
(45) Date of Patent: *May 19, 2026

(54) HEATING ASSEMBLY AND METHOD FOR INSULATION SYSTEM RESTORATION OF A POWER CABLE

(71) Applicant: NKT HV Cables AB, Lyckeby (SE)

(72) Inventors: Kristian Gustafsson, Karlskrona (SE); Jörn Antonischki, Fågelmara (SE)

(73) Assignee: NKT HV Cables AB, Lyckeby (SE)

( * ) Notice: Subject to any disclaimer, the term of this patent is extended or adjusted under 35 U.S.C. 154(b) by 940 days.

This patent is subject to a terminal disclaimer.

(21) Appl. No.: 17/808,914

(22) Filed: Jun. 24, 2022

(65) Prior Publication Data

US 2022/0415541 A1 Dec. 29, 2022

(30) Foreign Application Priority Data

Jun. 28, 2021 (EP) .................................... 21182058

(51) Int. Cl.
*H01B 13/00* (2006.01)
*H05B 6/02* (2006.01)

(52) U.S. Cl.
CPC ........... *H01B 13/0016* (2013.01); *H05B 6/02* (2013.01)

(58) Field of Classification Search
CPC ...... H01B 13/0016; H05B 6/02; H02G 1/145; H02G 15/08; H02G 15/18; B29C 45/14639
USPC ........... 219/636; 425/116; 264/319; 174/73.1
See application file for complete search history.

(56) References Cited

U.S. PATENT DOCUMENTS

| | | | | |
|---|---|---|---|---|
| 4,091,062 A | | 5/1978 | Nelson | |
| 4,204,896 A | * | 5/1980 | Richardson ............ | H02G 1/145 425/802 |
| 4,767,589 A | * | 8/1988 | Takaoka ................ | B29C 33/202 264/319 |
| 5,365,020 A | * | 11/1994 | Vallauri ................... | H01R 4/70 174/DIG. 8 |
| 5,407,340 A | * | 4/1995 | Daguet .................. | H02G 1/145 264/328.8 |
| 2019/0372320 A1 | | 12/2019 | Pozzati et al. | |

FOREIGN PATENT DOCUMENTS

SE 446571 B 9/1986

OTHER PUBLICATIONS

Lemaitre, Romuald, et al.; "High Pressure Moulding Technology"; Subtopic 2017; May 16, 2007; 5 Pages.
Extended European Search Report; Application No. 21182058.4; Completed: Nov. 17, 2021; Issued: Nov. 25, 2021; 10 Pages.
1 European Office Action; Application No. 21182058.4; Completed: Apr. 9, 2025; 11 Pages.

* cited by examiner

*Primary Examiner* — Elizabeth M Kerr
*Assistant Examiner* — Alba T Rosario-Aponte
(74) *Attorney, Agent, or Firm* — Whitmyer IP Group LLC

(57) ABSTRACT

A heating assembly configured to receive a power cable for restoring an insulation system of the power cable, the heating assembly including: a central pressurisation and heating structure, and a first and second lateral structure provided at a respective axial end of the central pressurisation and heating structure, the first and second lateral structure each having at least a 20 cm long axially extending section primarily made of a material at most having a conductivity of the order of 1000 S/m at 20° C.

19 Claims, 2 Drawing Sheets

HEATING ASSEMBLY AND METHOD FOR INSULATION SYSTEM RESTORATION OF A POWER CABLE

TECHNICAL FIELD

The present disclosure generally relates to power cable jointing and equipment for the same.

BACKGROUND

During power cable manufacturing, it may be necessary to joint two cable lengths. This may for example be as a result of limitations on the maximum continuous cable length that can be produced in the factory, or because of unintended cable cuts.

When two cable lengths are joined in the factory, all the cable layers are removed down to the conductors at the cable ends. The conductor ends are then joined, for example by welding, thus forming a conductor joint. The insulation system around the conductor joint is then rebuilt layer by layer. This is usually done by winding tape layer by layer. The insulation systems of the two cable ends are connected to the joint insulation system. Before the rebuilding process commences, the insulation system of the cable ends may be penciled, i.e. shaped conically tapering towards the conductor joint. The insulation system is restored in the same way in case a cable has been damaged during handling and needs to be repaired.

A device can be used for cross-linking the tape layers of the joint insulation system, or the restored insulation system of a cable that has been damaged. The joint insulation system is in this case placed inside the device, which is heated under pressure such that material in the tape layers melt together and become cross-linked without the creation of voids.

One drawback with using a device of the type described above is that the insulation system is pushed laterally outwards from the device due to the pressure difference between the interior of the device and the ambient pressure when the insulation system is being heated. The insulation system may thus become deformed, resulting in a reduced performance.

SUMMARY

A general object of the present disclosure is to provide a heating assembly and a method of restoring the insulation system of a power cable, which solve or at least mitigate the problems of the prior art.

There is hence according to a first aspect of the present disclosure provided a heating assembly configured to receive a power cable joint of a power cable for curing an uncured insulation system layer of the power cable joint, the heating assembly comprising: a central pressurisation and heating structure comprising: a first part comprising a first central channel configured to receive a portion of the power cable including the power cable joint, a second part comprising a second central channel configured to receive a portion of the power cable including the power cable joint, wherein the central pressurisation and heating structure is configured to be set in a closed state in which the first central channel faces the second central channel to thereby form a central heating chamber extending from a first end to a second end, opposite the first end, of the central pressurisation and heating structure, wherein the central pressurisation and heating structure is configured to be pressurised to obtain a first pressure higher than atmospheric pressure inside the central heating chamber when the power cable is arranged sealed in the central heating chamber; and a pressure compensator system comprising: a first lateral structure extending laterally from the first end of the central pressurisation and heating structure, the first lateral structure having a first lateral channel aligned with the central heating chamber and configured to receive a portion of the power cable, a second lateral structure extending laterally from the second end of the central pressurisation and heating structure, the second lateral structure having a second lateral channel aligned with the central heating chamber and configured to receive a portion of the power cable, wherein the first lateral structure is configured to be pressurised to obtain a second pressure higher than atmospheric pressure in the first lateral channel when the power cable is arranged sealed in the first lateral structure, and wherein the second lateral structure is configured to be pressurised to obtain a third pressure higher than atmospheric pressure in the second lateral channel when the power cable is arranged sealed in the second lateral structure, and wherein each of the first lateral structure and the second lateral structure has an at least 20 cm long axially extending section which is primarily made of material at most having a conductivity of the order of 1000 S/m at 20° C.

The first lateral structure and the second lateral structure provide counter-pressure to the pressure inside the central pressurisation and heating structure. Moreover, due to the low conductivity of material of which the axially extending sections of the first lateral structure and the second lateral structure are made at most only a small current is induced in these structures when high frequency heating coils are arranged around the structures for heating a conductor of a power cable to provide inner heating of restoration insulation system layers. The insulation system inside the first lateral structure and the second lateral structure will thus not become heated to temperatures that would cause them to melt or reach such low viscosity that they would be pushed axially out from these structures.

With the term "primarily" is meant more than 50%. Thus, more than 50% of the axially extending section of the first lateral structure and the second lateral structure is made of material at most having a conductivity of the order of 1000 S/m at 20° C.

The percentage of the material to the total material of the axially extending sections may be by volume or by weight.

The axially extending section of the first lateral structure may have a length of at least 30 cm, such as at least 40 cm.

The axially extending section of the second lateral structure may have a length of at least 30 cm, such as at least 40 cm.

According to one example the axially extending section of the first lateral structure may be the entire axial length of the first lateral structure. In this case, the first lateral structure is primarily made of material at most having a conductivity of the order of 1000 Sim at 20° C.

According to one example the axially extending section of the second lateral structure may be the entire axial length of the second lateral structure. In this case, the second lateral structure is primarily made of material at most having a conductivity of the order of 1000 S/m at 20° C.

The material may for example comprise a polymer such as epoxy or polyamide, glass fibre, and/or carbon fibre, or a reinforced polymer such as glass fibre or carbon fibre reinforced polymer.

The terms "cross-linking" and "curing" are used interchangeably herein. It follows that the terms "cross-linked" and "cured" are also interchangeable.

According to one embodiment the material at most has a conductivity of the order of 100 S/m at 20° C., such as 10 S/m at 20° C., such as 1 S/m at 20° C., such as 0.1 S/m at 20° C., such as 0.01 S/m at 20° C., such as 0.001 S/m at 20° C., such as 0.0001 S/m at 20° C.

According to one embodiment the material at most has a conductivity of the order of 10^-4 S/m at 20° C., such as 10^-5 S/m at 20° C., such as 10^-6 S/m at 20° C., such as 10^-7 S/m at 20° C., such as 10^-8 S/m at 20° C., such as 10^-9 S/m at 20° C., such as 10^-10 S/m at 20° C.

According to one embodiment each of the second pressure and the third pressure is within ±50% of the first pressure such as within ±40% of the first pressure, such as within ±30% of the first pressure, such as within ±20% of the first pressure, such as within ±10% of the first pressure.

According to one embodiment the second pressure and the third pressure are equal to the first pressure.

According to one embodiment the first lateral structure and the second lateral structure have smaller radial dimensions than the central pressurisation and heating structure. A respective high frequency (HF) heating coil may thereby be placed around the first lateral structure and the second lateral structure.

According to one embodiment the first pressure is a plurality of bar, such as at least 4 bar. The first pressure may for example at most be 15 bar, such as at most 10 bar.

According to one embodiment the central pressurisation and heating structure primarily comprises metal. The first part and the second part may for example have a respective wall or walls primarily comprising metal. The metal may for example be steel such as stainless steel or carbon steel, or aluminium.

According to one embodiment each of the axially extending section of the first lateral structure and the axially extending section of the second lateral structure has a wall or walls primarily made of said material having at most a conductivity of the order of 1000 S/m at 20° C.

According to one embodiment the wall or walls of each of the first lateral structure and the second lateral structure comprises at least 80% of said material.

One embodiment comprises a heating device configured to heat the central heating chamber.

One embodiment comprises an induction heating device including: a first high frequency, HF, heating coil configured to be arranged around the first lateral structure and a second HF heating coil configured to be arranged around the second lateral structure.

There is according to a second aspect of the present disclosure provided a method of restoring an insulation system around a conductor of a power cable, using the heating assembly of the first aspect, the method comprising: a) placing the power cable joint including a conductor having a restoration insulation system layer arranged around a conductor in one of the first central channel and the second central channel, b) placing the power cable in each of the first lateral structure and the second lateral structure, c) setting the central pressurisation and heating structure in the closed state, d) placing a first high frequency, HF, heating coil around the axially extending section of the first lateral structure and a second HF heating coil around the axially extending section of the second lateral structure, e) pressurising the central heating chamber to the first pressure, the first lateral channel to the second pressure, and the second lateral channel to the third pressure, and f) heating the restoration insulation system layer by outer heating inside the central pressurisation and heating structure and by inner heating of the restoration insulation system layer by feeding the first HF heating coil and the second HF heating coil with current to induce a current in the conductor.

The steps a)-e) may not necessarily have to be carried out in the mentioned order. Step b) could for example be performed first, followed by step d), step a), step c), step e) and then step f), or step a) could be performed first, followed step c), step e), steps b), step d) and finally step f).

The heating in step f) may be for curing the restoration insulation system layer. This may especially be the case if the restoration insulation system layer comprises a thermosetting polymer.

The heating in step f) may be for melting the restoration insulation system layer together with the corresponding layer of the insulation system of the power cable. This is of course the case when the restoration insulation system layer comprises a thermosetting polymer, but also if the restoration insulation system layer comprises a thermoplastic such as polypropylene.

According to one embodiment the conductor has a conductor joint, wherein in step a) the restoration insulation system layer is arranged around the conductor joint in one of the first central channel and the second central channel.

The first HF heating coil and the second HF heating coil will not induce current, or only induce a small current, in the first lateral structure and the second lateral structure. The first lateral structure and the second lateral structure will thus not heat up to a temperature that would cause the insulation system of the power cable to reach such a low viscosity inside these lateral structures that it would be deformed due to the pressure difference in the interface with the ambient which has much lower pressure. Moreover, since the pressure difference between the central heating chamber and the first and second lateral channels is low or the pressure is the same, there will be no or negligible deformation in the interface between the first and second lateral structures and the central pressurisation and heating structure.

The first HF heating coil may be arranged at most 2-2.5 m from the conductor joint, such as 1-2 m from the conductor joint, such as 0.8-1 m from the conductor joint.

The second HF heating coil may be arranged at most 2-2.5 m from the conductor joint, such as 1-2 m from the conductor joint, such as 0.8-1 m from the conductor joint.

One embodiment comprises performing steps a)-f) for each of a plurality of restoration insulation system layers.

Alternatively, all the restoration insulation system layers may be provided around the conductor joint and steps a)-f) are performed a single time, with step f) involving heating all the restoration insulation system layers simultaneously.

Typically, the first restoration insulation system layer applied to the conductor over the conductor joint, or over a section of a conductor typically without a conductor joint in case of restoration of an insulation system of a damaged cable, is an inner semiconducting layer. In case of a restoration of the insulation system of a damaged cable, the insulation system is stripped down to the conductor similarly as during jointing before the restoration of the insulation system begins. The inner semiconducting layer comprises a polymer such as polyethylene or polypropylene, and conductive particles such as carbon black. The inner semiconducting layer may be made of a tape that is wound over the conductor such that it overlaps with the inner semiconducting layer of each of the two cable lengths that are being jointed, or with the inner semiconducting layer at both sides of stripped insulation system in case of restoring a damaged power cable. The tape may comprise a cross-linking agent. Steps a)-d) are then performed.

Next, after first insulation system layer has been heated and has cooled down, a second restoration insulation system layer is applied over the inner semiconducting layer after the pressurisation and heating device has been opened. The second restoration insulation system layer is an insulation layer which is applied such that it overlaps with the insulation layer of each of the two cable lengths that are joined or with the insulation layer at both sides of stripped insulation system in case of restoring a damaged power cable. The insulation layer comprises a polymer such as polyethylene or polypropylene. The insulation layer is typically applied by taping. The tape may comprise a cross-linking agent. Steps a)-d) are then performed.

Finally, after the second insulation system layer has been heated and has cooled down, a third restoration insulation system layer is applied over the insulation layer after the pressurisation and heating device has been opened. The third restoration insulation system layer is an outer semiconducting layer. The outer semiconducting layer comprises a polymer such as polyethylene or polypropylene, and conductive particles such as carbon black. The outer semiconducting layer may be made of a tape that is wound over the insulation layer such that it overlaps with the outer semiconducting layer of each of the two cable lengths that are being jointed or with the outer semiconducting layer at both sides of stripped insulation system in case of restoring a damaged power cable. Steps a)-d) are then performed. The insulation system of the power cable has thus been rebuilt.

Instead of taping, the restoration insulation system layers may be formed for example by means of injection moulding.

According to one embodiment in step f) the outer heating and the inner heating are performed simultaneously. The heating/curing may thus be made more homogeneously in the radial direction.

According to one embodiment the first HF heating coil and the second HF heating coil are fed with an alternating current with a frequency in the kilohertz range, such as 1-500 kHz, or 5-300 kHz.

According to one embodiment prior to step f) the restoration insulation system layer is an uncured insulation system layer, and wherein in step f) the outer heating and the inner heating is for curing the restoration insulation system layer.

Generally, all terms used in the claims are to be interpreted according to their ordinary meaning in the technical field, unless explicitly defined otherwise herein. All references to "a/an/the element, apparatus, component, means, etc. are to be interpreted openly as referring to at least one instance of the element, apparatus, component, means, etc., unless explicitly stated otherwise.

BRIEF DESCRIPTION OF THE DRAWINGS

The specific embodiments of the inventive concept will now be described, by way of example, with reference to the accompanying drawings, in which.

DETAILED DESCRIPTION

The inventive concept will now be described more fully hereinafter with reference to the accompanying drawings, in which exemplifying embodiments are shown. The inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description.

Figure 1:
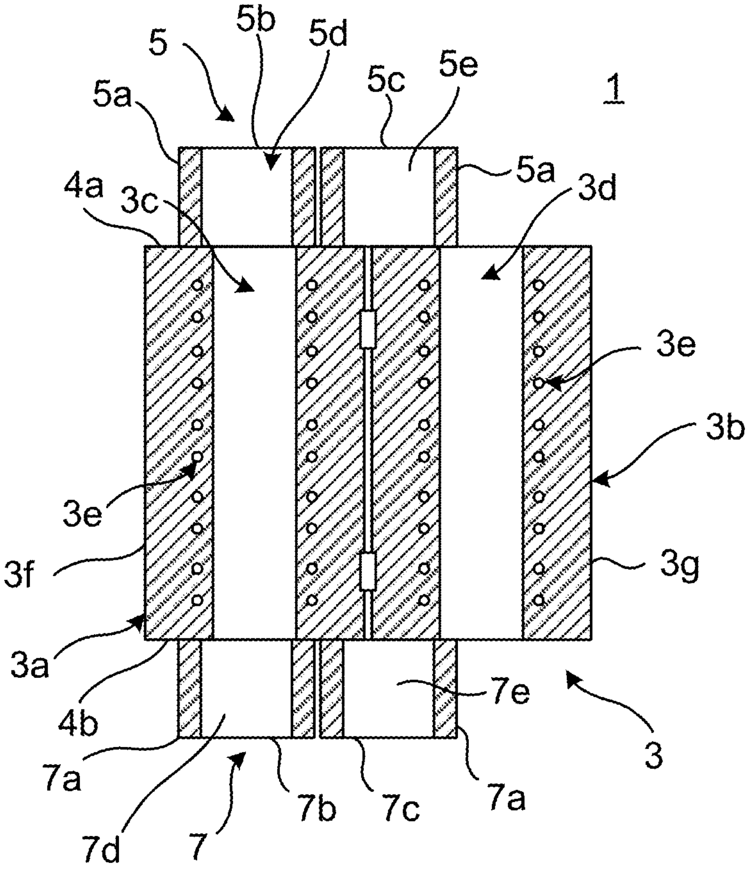
FIG. 1 schematically shows a top view of a heating assembly in an open state.

FIG. 1 schematically shows a top view of a heating assembly 1 in an open state. The heating assembly 1 is adapted for heating an insulation system layer of a power cable when restoring an insulation system of a power cable over a conductor joint or in case the power cable has been damaged. The heating may in some examples involve curing of the restoration insulation system layer.

The pressurisation and heating device 1 may be suitable for heating restoration insulation system layers of medium voltage or high voltage AC or DC power cables.

The heating assembly 1 comprises a central pressurisation and heating structure 3. The central pressurisation and heating structure 3 comprises a first part 3*a* and a second part 3*b*.

The first part 3*a* has a first central channel 3*c* extending from one end of the first part 3*a* to an opposite end of the first part 3*a*. The first central channel 3*c* is straight. The first central channel 3*c* is configured to receive a power cable including a power cable joint.

The second part 3*b* has a second central channel 3*d* extending from one end of the second part 3*b* to an opposite end of the second part 3*b*. The second central channel 3*d* is straight. The second central channel 3*d* is configured to receive a power cable including a power cable joint.

The first part 3*a* and the second part 3*b* are configured to be assembled with each other to thereby set the central pressurisation and heating structure 3 in a closed state. The central pressurisation and heating structure 3 is thus openable and closable.

The first part 3*a* and the second part 3*b* may for example be hingedly connected, or they may be completely separable from each other.

In the closed state of the central pressurisation and heating structure 3, the first central channel 3*c* faces the second central channel 3*d*. The first central channel 3*c* is axially aligned with the second central channel 3*d*. The first central channel 3*c* and the second central channel 3*d* thus form a central heating chamber extending from a first end 4*a* of the central pressurisation and heating structure 3 to a second end 4*b*, opposite to the first end 4*a*, of the central pressurisation and heating structure 3. The central heating chamber is thus configured to circumferentially enclose the power cable including the power cable joint along the length of the central pressurisation and heating structure 3.

The heating assembly 1 may comprise a heating device 3*e* configured to heat the central heating chamber to a predefined temperature. The predefined temperature is according to some examples a curing temperature for curing a thermosetting polymer such as polyethylene. According to some example the predefined temperature is a melting temperature for heating a thermoplastic polymer such as polyethylene until it melts.

The central pressurisation and heating structure 3 may according to one example comprise the heating device 3*e*. The heating device 3*e* may be configured to directly heat the central heating chamber for example by means of heating coils or similar means arranged around the first central channel 3*c* and the second central channel 3*d*. Alternatively, the heating device may be external to the central pressurisation and heating structure 3. In this case the heating device may be configured to externally heat gas such as noble gas introduced into the central heating chamber.

The first part 3*a* has a wall or walls 3*f* primarily comprising metal. The second part 3*b* has a wall or walls 3*g* primarily comprising metal.

The heating assembly 1 comprises a pressure compensator system which includes a first lateral structure 5 and a second lateral structure 7.

The first lateral structure 5 extends laterally from the first end 4*a* of the central pressurisation and heating structure 3.

The first lateral structure 5 is has an axially extending section primarily made of material at most having a conductivity of the order of 1000 S/m at 20° C. The material may for example be or comprise glass fibre or carbon fibre reinforced polymer, such as glass fibre or carbon fibre reinforced epoxy or polyamide.

Figure 2:
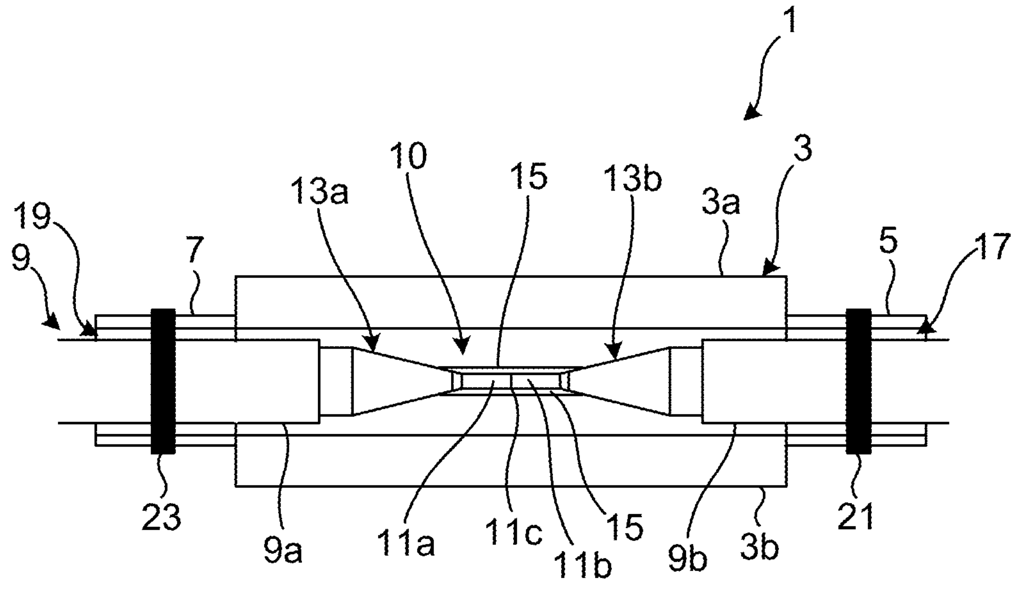
FIG. 2 shows a longitudinal section of a heating assembly while heating a restoration insulation system layer of a power cable.

The axially extending section is at least 20 cm long but could according to one variation be the entire length of the first lateral structure 5, which is the case in the example shown in FIGS. 1 and 2. In this case, the first lateral structure 5 is primarily made of material at most having a conductivity of the order of 1000 S/m at 20° C.

The axially extending section of the first lateral structure 5 has a wall or walls 5*a* of which for example at least 80% or at least 90% is made of material at most having a conductivity of the order of 1000 S/m at 20° C., such as 100 S/m at 20° C., such as 10 S/m at 20° C., 1 S/m at 20° C., such as 0.1 S/m at 20° C., such as 0.01 S/m at 20° C., such as 0.001 S/m at 20° C., such as 0.0001 S/m at 20° C., such as 10^-4 S/m at 20° C., such as 10^-5 S/m at 20° C., such as 10^-6 S/m at 20° C., such as 10^-7 S/m at 20° C., such as 10^-8 S/m at 20° C., such as 10^-9 S/m at 20° C., such as 10^-10 S/m at 20° C.

The second lateral structure 7 extends laterally from the second end 4*b* of the central pressurisation and heating structure 3. The first lateral structure 5 and the second lateral structure 7 extend away from the central pressurisation and heating structure 3 in opposite directions.

The second lateral structure 7 has an axially extending section primarily made of material at most having a conductivity of the order of 1000 S/m at 20° C. The material may for example be or comprise glass fibre or carbon fibre reinforced polymer, such as glass fibre or carbon fibre reinforced epoxy or polyamide.

The axially extending section is at least 20 cm long but could according to one variation be the entire length of the second lateral structure 7. which is the case in the example shown in FIGS. 1 and 2. In this case, the second lateral structure 7 is primarily made of material at most having a conductivity of the order of 1000 S/m at 20° C.

The axially extending section of the second lateral structure 7 has a wall or walls 7*a* of which for example at least 80% or at least 90% is made of material at most having a conductivity of the order of 1000 S/m at 20° C., such as 100 S/m at 20° C., such as 10 S/m at 20° C., 1 S/m at 20° C., such as 0.1 S/m at 20° C., such as 0.01 S/m at 20° C., such as 0.001 S/m at 20° C., such as 0.0001 S/m at 20° C., such as 10^-4 S/m at 20° C., such as 10^-5 S/m at 20° C., such as 10^-6 S/m at 20° C., such as 10^-7 S/m at 20° C., such as 10^-8 S/m at 20° C., such as 10^-9 S/m at 20° C., such as 10^-10 S/m at 20° C.

The first lateral structure 5 may be integrated with the central pressurisation and heating structure 3. Alternatively, the first lateral structure 5 may be configured to be connected to or attached in a sealed manner to the central pressurisation and heating structure 3.

The second lateral structure 7 may be integrated with the central pressurisation and heating structure 3. Alternatively, the second lateral structure 7 may be configured to be connected in a sealed manner to the central pressurisation and heating structure 3.

The first lateral structure 5 may be openable. The first lateral structure 5 may comprise a first lateral structure part 5*b* and a second lateral structure part 5*c* which are configured to be assembled with each other. The first lateral structure part 5*b* has a straight open channel 5*d*, extending from one end to an opposite end of the first lateral structure part 5*b*. The second lateral structure part 5*c* has a straight open channel 5*e*, extending from one end to an opposite end of the second lateral structure part 5*c*. The channels 5*d* and 5*e* form a first lateral channel which is circumferentially closed when the first lateral structure part 5*b* and the second lateral structure part 5*c* are assembled with each other and the first lateral structure 5 is closed. The first lateral channel is configured to receive a power cable. The first lateral channel 5*c* is axially aligned with the central heating chamber.

The first lateral structure part 5*b* and the second lateral structure part 5*c* may for example be hinged or they may be completely separable from each other.

The second lateral structure 7 may be openable. The second lateral structure 7 may comprise a third lateral structure part 7*b* and a fourth lateral structure part 7*c* which are configured to be assembled with each other. The third lateral structure part 7*b* has a straight open channel 7*d*, extending from one end to an opposite end of the third lateral structure part 7*b*. The fourth lateral structure part 7*c* has a straight open channel 7*e*, extending from one end to an opposite end of the fourth lateral structure part 7*c*. The channels 7*d* and 7*e* form a second lateral channel which is circumferentially closed when the third lateral structure part 7*b* and the fourth lateral structure part 7*c* are assembled with each other and the second lateral structure 7 is closed. The second lateral channel is configured to receive a power cable. The second lateral channel 7*c* is axially aligned with the central heating chamber.

The third lateral structure part 7*b* and the fourth lateral structure part 7*c* may for example be hinged or they may be completely separable from each other.

Instead of an openable first lateral structure, the first lateral structure could be a pipe that is disposable after use. It could for example be sawed into two or more pieces to remove it from around the power cable.

Instead of an openable second lateral structure, the second lateral structure could be a pipe that is disposable after use. It could for example be sawed into two or more pieces to remove it from around the power cable.

Figure 3:
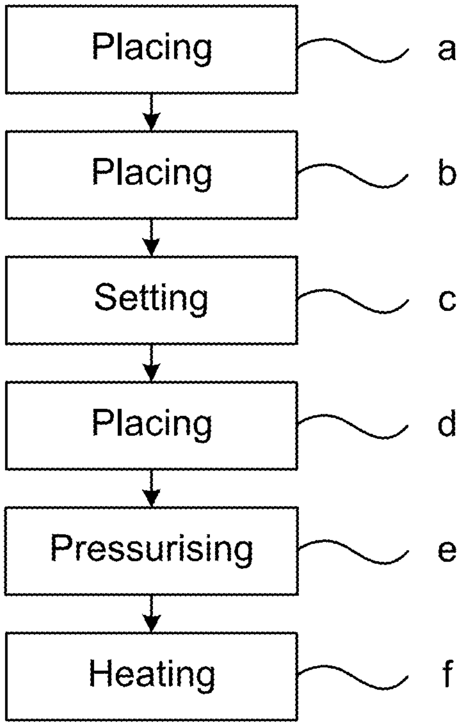
FIG. 3 is a flowchart of a method of restoring the insulation system of a power cable.

With reference to FIGS. 2 and 3, a method of curing an uncured insulation system layer of power cable joint, using the heating assembly 1 will now be described.

The use of the curing assembly 1 will now be described in the context of a jointing operation. The process is similar in case the insulation system of a power cable that has been damaged is restored. Further, the insulation system that is being restored in the present example is being cured because in the example the restoration insulation system layer comprises a thermosetting polymer. The process is however similar in case a thermoplastic is used, except that the temperatures used in the step of heating may be adapted to the characteristics of the thermoplastic.

FIG. 2 schematically shows a power cable 9 comprising two cable lengths 9*a* and 9*b* that are in the process of being jointed inside the heating assembly 1. The central pressurisation and heating structure 3 is in the closed state and the power cable 9 extends through the central pressurisation and heating structure 3 inside the central heating chamber 10.

The power cable 9 also extends through the first lateral structure 5 and the second lateral structure 7 which are arranged at opposite axial ends of the central pressurisation and heating structure 3.

In the state shown in FIG. 2, the conductors 11*a* and 11 *b* of the two cable lengths 9*a* and 9*b* have been jointed and a conductor joint 11*c* has thus been created. The two conductors 11*a*, 11 *b* thus form a single conductor.

The jointing of the conductors 11*a*, 11 *b* may for example be performed by welding, brazing or by using mechanical connectors.

Each cable length 9*a*, 9*b* has an insulation system 13*a*, 13*b* which has been shaped conically adjacent to the conductor joint 11*c*. A region comprising the conically shaped insulation systems 13*a*, 13*b* and the conductor joint 11*c* is the power cable joint.

The joint insulation system, i.e. the insulation system around the conductor joint 11*c* and between the conically shaped ends of the insulation systems 13*a* and 13*b* is then rebuilt layer by layer.

A first restoration insulation system layer 15, which is uncured, is provided around the conductor joint 11*c* and arranged overlappingly with the corresponding insulation layer of the insulation systems 13*a*, 13*b* at their conically shaped ends. The first restoration insulation system layer 15 may for example be formed by tape wound around the exposed conductor.

The central heating chamber 10 may be pressurised to a first pressure higher than atmospheric pressure. The first pressure is a plurality of bar, such as in a range of 4-15 bar, for example 4-10 bar.

The central heating chamber 10 may be filled with noble gas during curing, to prevent oxidation while rebuilding the insulation system over the conductor joint 11*c*. The noble gas may be pressurised to the first pressure.

The first lateral channel 17 of the first lateral structure 5 may be pressurised to a second pressure. The second pressure is plurality of bar, such as in a range of 3-15 bar, for example 3-10 bar.

The second lateral channel 19 of the second lateral structure 7 may be pressurised to a third pressure. The third pressure is plurality of bar, such as in a range of 3-15 bar, for example 3-10 bar.

The second pressure and the third pressure is within ±50% of the first pressure such as within ±40% of the first pressure, such as within ±30% of the first pressure, such as within ±20% of the first pressure, such as within ±10% of the first pressure. At least one of or both the second pressure and the third pressure may according to one example be equal to the first pressure.

In a step a) the power cable joint including the conductor with the conductor joint 11*c* and the restoration insulation system layer 15 arranged around the conductor joint is placed in one of the first central channel 3*c* and the second central channel 3*d*.

In a step b) the power cable 9 is placed in each of the first lateral structure 5 and the second lateral structure 7. The first lateral structure 5 and the second lateral structure 7 may be open at this stage and the power cable 9 may be arranged in the channels 5*d*, 5*e*, 7*d*, 7*e*.

Steps a) and b) may be carried out simultaneously or essentially simultaneously.

In a step c) the central pressurisation and heating structure is set in the closed state, whereby the central heating chamber 10 is formed around the power cable joint. Step c) may also involve setting the first lateral structure 5 and the second lateral structure 7 in their closed state.

The heating assembly may comprise sealing members such as gaskets to seal the central heating chamber 10, the first lateral channel 17 and the second lateral channel 19 against the power cable 9.

As shown in FIG. 2, the first lateral structure 17 and the second lateral structure 19 may have smaller radial dimensions than the central pressurisation and heating structure 3.

The heating assembly 1 may comprise an induction heating device comprising a first HF heating coil 21 and a second HF heating coil 23. The induction heating device may comprise a power supply system configured to feed the first HF heating coil 21 and the second HF heating coil with an alternating current having a frequency in the kilohertz range. The induction heating device may comprise a water-cooling system configured to cool the first HF heating coil 21 and the second HF heating coil 23.

In a step d) the first HF heating coil 21 is placed around the axially extending section of the first lateral structure 5 and the second HF heating coil 23 is placed around the axially extending section of the second lateral structure 7. In case the first lateral structure 5 comprises also one or more sections made of a material with higher electrical conductivity than the axially extending section, the first HF heating coil 21 is placed around the axially extending section at a proper distance from the interface between the two materials. In case the second lateral structure 7 comprises also one or more sections made of a material with higher electrical conductivity than the axially extending section, the second HF heating coil 23 is placed around the axially extending section at a proper distance from the interface between the two materials.

The first HF heating coil 21 and the second HF heating coil 23 may for example be openable or splittable into several parts to facilitate the placement around the power cable 9 in step d).

The first HF heating coil 21 and the second HF heating coil 23 may be arranged at an equal axial distance from the conductor joint 11*c*. This distance may at most be 2-2.5 m from the conductor joint 11*c*, such as 1-2 m from the conductor joint 11*c*, such as 0.8-1 m from the conductor joint 11*c*.

In a step e) the central heating chamber 10 is pressurised to the first pressure, the first lateral channel 17 to the second pressure, and the second lateral channel 19 to the third pressure.

In a step f) the restoration insulation system layer 15 is heated by outer heating inside the central pressurisation and heating structure 3 by means of the heating device and by inner heating of the restoration insulation system layer 15 by feeding the first HF heating coil 21 and the second HF heating coil 23 with current to induce a current in the conductor. According to the present example, the heating in step f) involves curing the restoration insulation system layer 15.

In step f) the outer heating and the inner heating are typically performed simultaneously.

Steps a)-f) are typically performed for each of a plurality of restoration insulation system layers of the power cable joint, for example each being uncured before step f). After each iteration, the insulation system layer(s) is/are cooled down to a predetermined temperature such as to 60° C. or less.

The inventive concept has mainly been described above with reference to a few examples. However, as is readily appreciated by a person skilled in the art, other embodiments than the ones disclosed above are equally possible within the scope of the inventive concept, as defined by the appended claims.

The invention claimed is:

1. A heating assembly configured to receive a power cable joint of a power cable for restoring an insulation system of the power cable, the heating assembly comprising:

- a central pressurization and heating structure comprising:
  - a first part including a first central channel configured to receive a first portion of the power cable,
  - a second part including a second central channel configured to receive the first portion of the power cable,
  - wherein the central pressurization and heating structure is configured to be set in a closed state in which the first central channel faces the second central channel to thereby form a central heating chamber extending from a first end to a second end, opposite the first end, of the central pressurization and heating structure,
  - wherein the central pressurization and heating structure is configured to be pressurised to obtain a first pressure higher than atmospheric pressure inside the central heating chamber when the power cable is arranged sealed in the central heating chamber; and
- a pressure compensator system comprising:
  - a first lateral structure extending laterally from the first end of the central pressurization and heating structure, the first lateral structure having a first lateral channel aligned with the central heating chamber and configured to receive a second portion of the power cable,
  - a second lateral structure extending laterally from the second end of the central pressurization and heating structure, the second lateral structure having a second lateral channel aligned with the central heating chamber and configured to receive a third portion of the power cable,
  - wherein the first lateral structure is configured to be pressurised to obtain a second pressure higher than atmospheric pressure in the first lateral channel when the power cable is arranged sealed in the first lateral structure, and wherein the second lateral structure is configured to be pressurised to obtain a third pressure higher than atmospheric pressure in the second lateral channel when the power cable is arranged sealed in the second lateral structure, and
  - wherein each of the first lateral structure and the second lateral structure has an at least 20 cm long axially extending section which is primarily made of material at most having a conductivity of the order of 1000 S/m at 20° C.

2. The heating assembly as claimed in claim 1, wherein the material at most has a conductivity of the order of 100 S/m at 20° C.

3. The heating assembly as claimed in claim 1, wherein each of the second pressure and the third pressure is within ±50% of the first pressure.

4. The heating assembly as claimed in claim 1, wherein the second pressure and the third pressure are equal to the first pressure.

5. The heating assembly as claimed in claim 1, wherein the first lateral structure and the second lateral structure have smaller radial dimensions than the central pressurization and heating structure.

6. The heating assembly as claimed in claim 1, wherein the first pressure is a plurality of bar.

7. The heating assembly as claimed in claim 1, wherein the central pressurization and heating structure primarily includes metal.

8. The heating assembly as claimed in claim 1, wherein each of the axially extending section of the first lateral structure and the axially extending section of the second lateral structure has a wall or walls primarily made of said material having at most a conductivity of the order of 1000 S/m at 20° C.

9. The heating assembly as claimed in claim 8, wherein the wall or walls of each of the first lateral structure and the second lateral structure includes at least 80% of said material.

10. The heating assembly as claimed in claim 1, comprising a heating device configured to heat the central heating chamber.

11. The heating assembly as claimed in claim 1, comprising an induction heating device including: a first high frequency, HF, heating coil configured to be arranged around the first lateral structure and a second HF heating coil configured to be arranged around the second lateral structure.

12. A method of restoring an insulation system around a conductor of a power cable, the method comprising:

using the heating assembly as claimed in claim 1,

- a) placing the power cable joint including a conductor having a restoration insulation system layer arranged around the conductor in one of the first central channel and the second central channel,
- b) placing the power cable in each of the first lateral structure and the second lateral structure,
- c) setting the central pressurization and heating structure in the closed state,
- d) placing a first high frequency, HF, heating coil around the axially extending section of the first lateral structure and a second HF heating coil around the axially extending section of the second lateral structure,
- e) pressurising the central heating chamber to the first pressure, the first lateral channel to the second pressure, and the second lateral channel to the third pressure, and
- f) heating the restoration insulation system layer by outer heating inside the central pressurization and heating structure and by inner heating of the restoration insulation system layer by feeding the first HF heating coil and the second HF heating coil with current to induce a current in the conductor.

13. The method as claimed in claim 12, comprising performing steps a)-f) for each of a plurality of restoration insulation system layers.

14. The method as claimed in claim 12, wherein in step f) the outer heating and the inner heating are performed simultaneously.

15. The heating assembly as claimed in claim 2, wherein each of the second pressure and the third pressure is within ±50% of the first pressure.

16. The heating assembly as claimed in claim 2, wherein the second pressure and the third pressure are equal to the first pressure.

17. The heating assembly as claimed in claim 2, wherein the first lateral structure and the second lateral structure have smaller radial dimensions than the central pressurization and heating structure.

18. The heating assembly as claimed in claim 2, wherein the first pressure is a plurality of bar.

19. The heating assembly as claimed in claim 2, wherein the central pressurization and heating structure primarily includes metal.

* * * * *